J. EDSON.

Street-Sweeping Machine.

No. 6,658. Reissued Sept. 28, 1875.

Witnesses:

W. L. Torrey

C. W. Eldredge.

Inventor:

Jacob Edson.

by Albert Andrews his atty.

UNITED STATES PATENT OFFICE.

JACOB EDSON, OF BOSTON, MASSACHUSETTS.

IMPROVEMENT IN STREET-SWEEPING MACHINES.

Specification forming part of Letters Patent No. 159,025, dated January 26, 1875; reissue No. 6,658, dated September 28, 1875; application filed August 28, 1875.

DIVISION A.

*To all whom it may concern:*

Be it known that I, JACOB EDSON, of Boston, in the county of Suffolk and State of Massachusetts, have invented certain new and useful Improvements in Rotary Brushes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to improvements in spiral brushes for street-sweeping machines and other purposes; and consists, first, in making the barrel with additional rows of holes for the insertion of brushes when the original brushes shall be worn out, which additional rows of holes are arranged in spiral form between and running parallel with the brushes that are secured to the circumference of the barrel.

My invention also relates to a peculiar manner of locating each set of brushes on the barrel, the same consisting in drilling the holes for each set of brushes parallel to each other, and not diverging from the center of the barrel, by which arrangement the outer ends of each set of brushes are made to interlock and sustain, instead of spreading apart from, each other, and by this, my arrangement, I am able to increase the durability of the brush, as well as to perform a better work as compared with the ordinary brushes, in which each set of brushes are diverging from a common center.

The brushes in this, my invention, may be made of any common material, such as bristles, metal, or wood, as may be desired.

Figure 1:
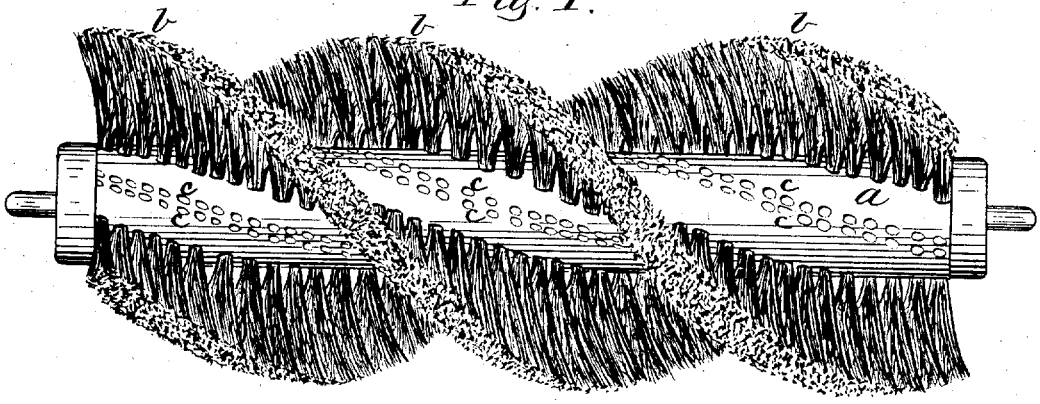
Figure 2:
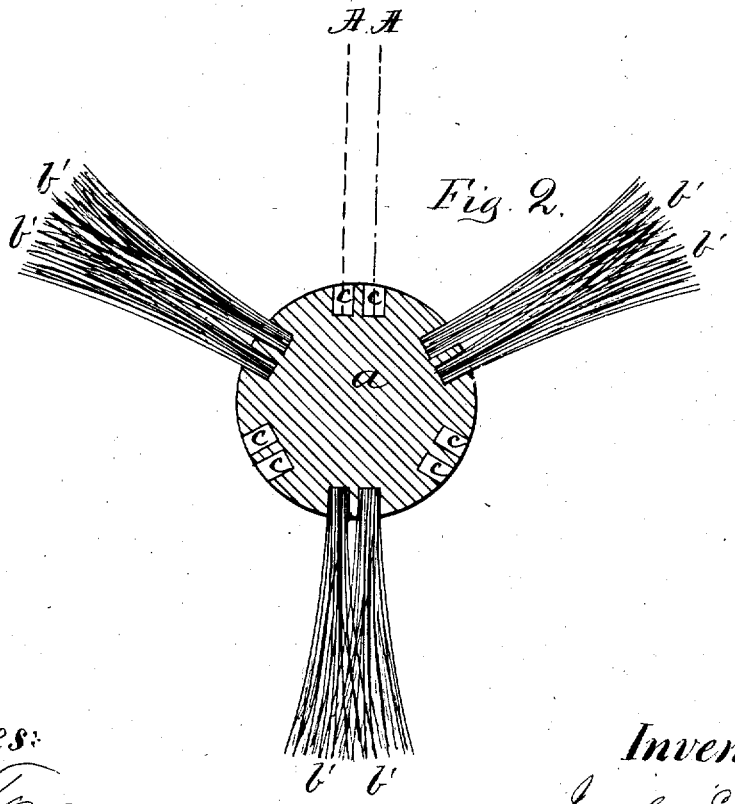

On the accompanying drawing, Figure 1 represents a side view of my improved brush, and Fig. 2 represents a cross-section of the same.

Similar letters refer to similar parts wherever they occur on the drawings.

*a* represents the barrel, to which the brushes *b* are attached in parallel spirals, as shown. Between each successive spiral brush *b b* are made additional rows of holes, *c c c*, for the purpose of inserting brushes therein when the original set is worn out, by which arrangement the barrel can be used for two successive set of brushes without further alteration. Each spiral row of brushes is composed of two or more individual brushes, *b′ b′*, arranged parallel with each other—that is, the holes are drilled in the barrel in a parallel direction, and not toward a common center—by which arrangement the exterior ends of each set of brushes are mixed together and made to interlock each other, and whereby the brush is made more durable than if each individual brush was independent of its fellow. The dotted lines A A, in Fig. 2, show the direction in which the holes for a set of brushes are made, and I may still further interlock the outer ends of each set of brushes by drilling the said holes, so that they shall be a little nearer together at the surface of the barrel than at the bottom of the holes, although for ordinary purposes a parallel direction will prove sufficient for the interlocking and sustaining of the brushes, one within another.

What I wish to secure by Letters Patent, and claim, is—

1. A brush-barrel provided with additional rows of holes, *c c c*, arranged between the brushes *b b*, as and for the purpose set forth and described.

2. A spiral brush composed of series or sets of parallel brushes *b′ b′*, interlocking and sustaining each other, substantially as and for the purpose set forth and described.

In testimony that I claim the foregoing as my invention I have hereunto set my hand this 21st day of August, 1875.

JACOB EDSON.

Witnesses:

ALBAN ANDRÉN,

JOS. C. TORREY.